3,453,298
METHOD OF PRODUCING CARBONYL ACRYLO-
NITRILE MOLYBDENUM SUBSTITUTED COM-
PLEXES AND PRODUCT THEREOF
Harold R. Deck, Bartlesville, Okla., assignor to Phillips
Petroleum Company, a corporation of Delaware
No Drawing. Filed Feb. 14, 1966, Ser. No. 527,102
Int. Cl. C07f 11/00, 9/28, 9/70
U.S. Cl. 260—429
9 Claims

ABSTRACT OF THE DISCLOSURE

A method for preparing carbonyl acrylonitrile molybdenum substituted complexes which comprises reacting molybdenum carbonyl with acrylonitrile to form a first reaction product and subsequently reacting the first reaction product with a compound having the formula $(R)_3X$ wherein R is a radical of alkyl, aryl, or combinations thereof having from 2–10 carbon atoms and X is a trivalent element of phosphorous, arsenic, or antimony. The carbonylacrylonitrile$(R)_3X$molybdenum product is also claimed. The molybdenum complex is useful as a catalyst, particularly in the isomerization of olefins such as 4-vinylcyclohexene.

---

This invention relates to a method for making molybdenum complexes and the product thereof.

Heretofore, acrylonitrile when contacted with certain other compounds under elevated temperatures has polymerized rather than reacted with those other compounds.

Quite surprisingly, it has now been found that molybdenum carbonyl compounds and acrylonitrile can be reacted to form a first product and that first product further reacted with a compound having the formula $(R)_3X$ wherein R is selected from radicals from the group consisting of alkyl, aryl, and combinations thereof, e.g. alkaryl, aralkyl, and the like, having from 2 to 10 carbon atoms, and wherein X is a trivalent element selected from the group consisting of phosphorous, arsenic, and antimony, to form a molybdenum complex. The molybdenum complex has been found to be useful as a catalyst particularly in the isomerization of certain olefins.

Accordingly, the molybdenum complex of this invention which has catalytic utility is an acrylonitrile complex of molybdenum-$(R)_3X$ (as above defined)-carbonyl, i.e. carbonylacrylonitrile$(R)_3X$molybdenum.

Accordingly, it is an object of this invention to provide a new and improved method for making molybdenum complexes. Another object of this invention is to provide a new and useful catalyst.

Other aspects, objects, and the several advantages of this invention will be apparent to those skilled in the art from the description and appended claims.

The molybdenum complex of this invention should be formed by reacting the molybdenum carbonyl compound with the acrylonitrile first and then reacting the product of this first reaction with the compound having the formula $(R)_3X$. The reaction temperature can vary widely but will generally be in the range of from about 25 to about 200, preferably from about 30 to about 100° C. The reaction pressure can be atmospheric or sub-atmospheric but should not greatly exceed atmospheric because of the evolution of carbon monoxide during the formation of the molybdenum complex. The reactions of all the compounds of this invention can be carried out in the presence or absence of a diluent which is substantially inert to the reactants and products formed. For example, the acrylonitrile can be used as a solvent as well as a reactant or suitable inert solvents as cyclic and acyclic ethers having from 4 to 12 carbon atoms per molecule can be employed. The amount of each of the three reactants employed can vary widely but generally the mol ratios of acrylonitrile to molybdenum carbonyl will be at least about 20:1 and, when acrylonitrile is not used as solvent, can be in the range of from about 10:1 to about 20:1, preferably from about 10:1 to about 15:1. The mol ratio of the compound represented by the formula $(R)_3X$ to the molybdenum carbonyl will be in the range of from about 0.2:1 to about 4:1, preferably from about 1:1 to about 3:1. The reaction time will vary widely but will generally be in the range of from about 10 minutes to about 20 hours.

Examples of suitable $(R)_3X$ compounds include triethylphosphine, dipropylmethylarsine, triisobutylstibine, dioctyltolylphosphine, tridecyl stibine, and the like.

All the reactants for this invention can be readily prepared by those skilled in the art, as well as obtained commercially. For example, molybdenum carbonyl can be formed by simply passing carbon monoxide over molybdenum metal and alkyl phosphines can be prepared by the reaction of sodium phosphide with alkyl halides.

Example

A solution containing 10.56 grams (40 millimoles) of molybdenum hexacarbonyl and 50 cubic centimeters of acrylonitrile (0.77 mole) was heated at about 77° C. and atmospheric pressure until carbon monoxide evolution from the mixture ceased. To this mixture 20.96 grams (80 millimoles) of triphenyl phosphine dissolved in 20 cubic centimeters of acrylonitrile was added and the resulting mixture continued to be heated at about 77° C. for 4½ hours. The solid formed in this reaction mixture was separated therefrom by centrifugation, washed with cyclopentane, and dried.

Elemental chemical analysis of this solid was carried out and the following results obtained:

Calc.: C, 66.5; H, 4.35; N, 1.85. Found: C, 65.3; H, 4.3; N, 1.5.

The results of the elemental analysis show that this composition very closely conforms to the compound

$$Mo[CH_2=CHCN][P(C_6H_5)_3]_2(CO)_3$$

Further, the presence of metal carbonyl groups in the compound was confirmed by infrered analysis.

A mixture of 40 milliliters of 4-vinylcyclohexene, 1 gram of acetylacetone and 1 gram of the above-formed solid (molybdenum complex) was heated under a nitrogen atmosphere until the kettle temperature reached 144° C., i.e. for about 80 minutes. Gas liquid chromatographic analysis of the reaction mixture showed that the 4-vinylcyclohexene had been converted to 4-ethylidenecyclohexene and 3-ethylidenecyclohexene.

Thus, the molybdenum complex of this invention served as a catalyst for the isomerization of 4-vinylcyclohexene.

Reasonable variations and modifications are possible within the scope of this disclosure without departing from the spirit and scope thereof.

I claim:
1. A method for making a carbonylacrylonitrile$(R)_3X$-molybdenum complex which comprises the steps of
   (1) reacting under suitable reaction conditions molybdenum carbonyl and acrylonitrile to form a significant amount of a first reaction product;
   (2) contacting under suitable reaction conditions said first reaction product and a compound having the formula $(R)_3X$ wherein R is a radical selected from the group consisting of alkyl, aryl, and combinations thereof, each having from 2 to 10 carbon atoms and X is a trivalent element selected from the group consisting of phosphorous, arsenic, and antimony; and
   (3) recovering the carbonylacrylonitrile$(R)_3X$molybdenum complex.

2. A method according to claim 1 wherein said carbonylacrylonitrile$(R)_3X$molybdenum complex has the formula $(CO)_3(CH_2=CHCN)(R_3X)_2Mo$ and said molybdenum carbonyl is molybdenum hexacarbonyl.

3. The method according to claim 1 wherein both the reaction of the molybdenum hexacarbonyl and acrylonitrile, and the reaction of the first reaction product and $(R)_3X$ are carried out at a temperature in the range of from about 25 to about 200° C. under pressures no greater than atmospheric, the mol ratio of acrylonitrile to molybdenum hexacarbonyl is at least about 10:1, and the mol ratio of the $(R)_3X$ compound to molybdenum hexacarbonyl is in the range of from about 0.2:1 to about 4:1.

4. The method according to claim 3 wherein the reactions are carried out in the presence of a solvent which is substantially inert to the reactants and the products formed thereby, and the reactions are carried out at a temperature in the range of 30 to 100° C.

5. The method according to claim 4 wherein said solvents are at least one selected from the group consisting of acrylonitrile and acyclic and cyclic ethers containing from 4 to 12 carbon atoms per molecule.

6. The method according to claim 1 wherein the compound having the formula $(R)_3X$ is triphenylphosphine.

7. The complex comprising carbonylacrylonitrile-$(R)_3X$molybdenum wherein R is a radical selected from the group consisting of alkyl, aryl, and combinations thereof each having from 2 to 10 carbon atoms, and X is a trivalent element selected from the group consisting of phosphorous, arsenic, and antimony.

8. The complex according to claim 7 which has the formula $(CO)_3(CH_2=CHCN)(R_3X)_2Mo$.

9. Tricarbonylmonoacrylonitrilebis(triphenylphosphine)molybdenum.

References Cited

UNITED STATES PATENTS 3,322,799   5/1967   Coffield et al. _____ 260—429

OTHER REFERENCES

Massey et al.: Chemistry and Industry (London), Apr. 8, 1961, pp. 436–7.

Schrauzer: J. Am. Chem. Soc., vol. 82 (1960), pp. 1008–9.

TOBIAS E. LEVOW, *Primary Examiner.*

A. P. DEMERS, *Assistant Examiner.*

U.S. Cl. X.R.

252—431; 260—666